Figures 4, 5:
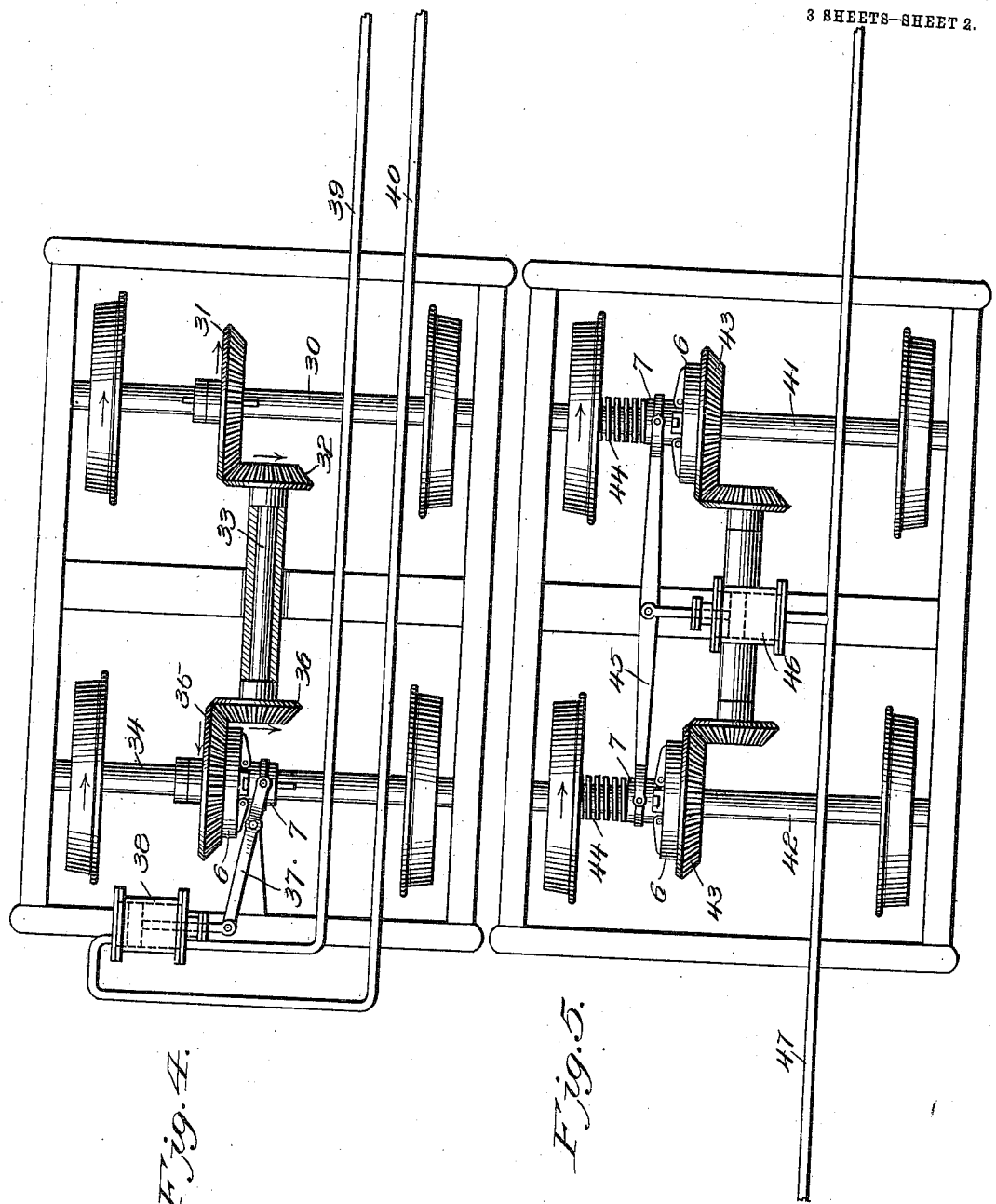

A. B. JONES.
MEANS FOR NEUTRALIZING FORCE.
APPLICATION FILED DEC. 28, 1909.
983,237.
Patented Jan. 31, 1911.
3 SHEETS—SHEET 1.
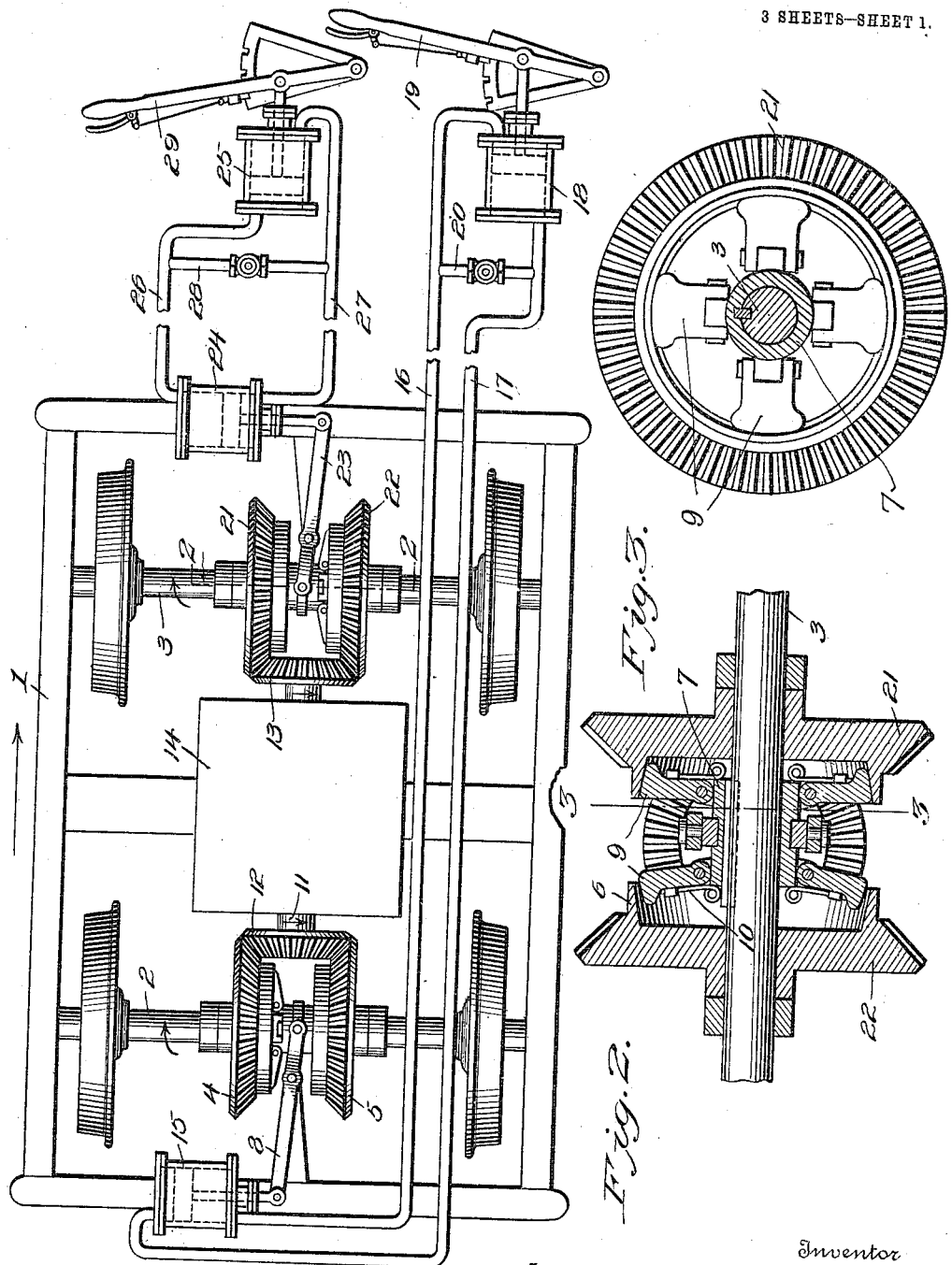
Witnesses
Edwin G. McKee
V. B. Hillyard
Inventor
Arthur B. Jones
By Victor J. Evans
Attorney

A. B. JONES.
MEANS FOR NEUTRALIZING FORCE.
APPLICATION FILED DEC. 28, 1909.

983,237.

Patented Jan. 31, 1911.
3 SHEETS—SHEET 2.

Witnesses
Edwin G. McKee
V. B. Hillyard

Inventor
Arthur. B. Jones
By Victor J. Evans
Attorney

THE NORRIS PETERS CO., WASHINGTON, D. C.

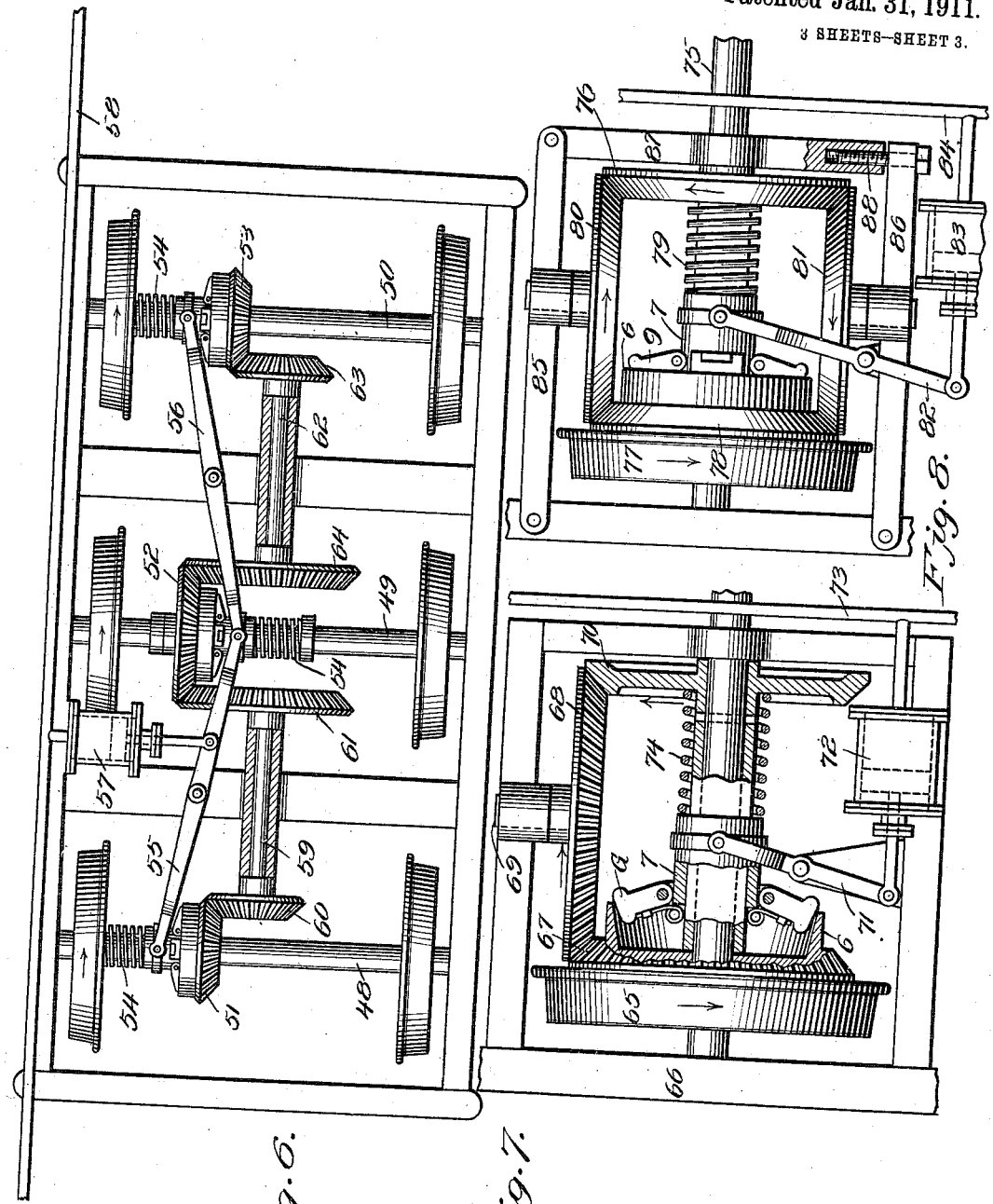

UNITED STATES PATENT OFFICE.

ARTHUR B. JONES, OF ST. JOHNS, MICHIGAN.

MEANS FOR NEUTRALIZING FORCE.

983,237.

Specification of Letters Patent.  Patented Jan. 31, 1911.

Application filed December 28, 1909. Serial No. 535,331.

*To all whom it may concern:*

Be it known that I, ARTHUR B. JONES, a citizen of the United States, residing at St. Johns, in the county of Clinton and State of Michigan, have invented new and useful Improvements in Means for Neutralizing Force, of which the following is a specification.

The present invention has for its object to devise novel mechanism whereby the momentum of a moving body, such as a vehicle, may be utilized to check the speed and bring said body quickly to a state of rest, being of especial advantage in an emergency, so as to prevent a casualty.

The invention contemplates connecting means of peculiar arrangement between shafts, whereby the same may be caused to rotate in opposite directions, with the result that the power expended to drive one shaft is neutralized by the power expended to drive the other shaft, particularly when the parts secured to said shafts are rotary and in frictional contact with a third element, such as a track, road bed, or the like.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of the truck of a car having two axles connected by means embodying the invention and showing a mechanism whereby the axle connecting means may be thrown into or out of engagement. Fig. 2 is a detail section on the line 2—2 of Fig. 1. Fig. 3 is a section on the line 3—3 of Fig. 2. Fig. 4 is a view similar to Fig. 1, showing a modification. Fig. 5 is a view corresponding to Fig. 4 of a further modification. Fig. 6 is a modification showing an embodiment of the invention to a three wheeled truck. Fig. 7 is a modification showing an arrangement of three spur gears and a coöperating clutch. Fig. 8 is a further modification, showing an arrangement of four friction gears.

Corresponding and like parts are referred to in the following description, and indicated in all the views of the drawings, by the same reference characters.

Fig. 1 shows a two wheeled truck, the truck frame being indicated by the numeral 1 and the axles by the numerals 2 and 3. The axle 2 is provided with spur gears 4 and 5 loosely mounted thereon and having inwardly extending rims 6 upon their opposing sides, which constitute clutch elements. A sleeve 7 is mounted upon the axle 2 between the spur gears 4 and 5 and is free to move on said axle, but is caused to rotate therewith by means of a feather and spline connection. The sleeve 7 is adapted to be moved by means of a shipper lever 8, suitably mounted upon a convenient part of the framework and adapted to be operated in any manner. The clutch dogs 9 are pivotally mounted upon the sleeve 7 and are normally held in a given position by means of springs 10. The dogs 9 and sleeve 7 form in effect a clutch element to coöperate with the clutch elements 6 of the spur gears. When the sleeve 7 is moved to a neutral position between the spur gears 4 and 5, the latter are adapted to rotate freely upon the axle 2 without imparting movement thereto. Upon moving the sleeve 7 to the limit of its throw in one direction or the other a set of clutch dogs 9 engage with the rim or clutch element 6 of one or the other of the spur gears 4 or 5, thereby causing the axle 2 to rotate forwardly or rearwardly according to which of the spur gears 4 or 5 is positively clutched to the axle 2. A shaft 11 is arranged lengthwise of the truck and is provided at one end with a spur gear 12 and at its opposite end with a spur gear 13, said shaft in the present instance being the power driven shaft of a motor 14. The spur gear 12 meshes with the spur gears 4 and 5, hence drives the latter in opposite directions, as indicated by the arrows. It follows that when the spur gear 4 is clutched to the axle 2 the latter is rotated in one direction and when the spur gear 5 is clutched to the axle 2 the latter is rotated in an opposite direction. When one spur gear 4 is clutched to the axle the other spur gear 5 is free to rotate thereon. The parts are so arranged that only one of the spur gears at a time can be clutched to the axle. The shipper lever 8 may be operated in any manner and for convenience a motor cylinder 15 is provided, the same being connected by pipes 16 and 17 with a corresponding motor cylinder 18, whose piston is adapted to be operated by means of a lever 19. A valved pipe 20 connects the pipes 16 and 17 so as to equalize the liquid or other medium employed for transmitting power from one motor cylinder 18 to the other motor cylinder 15, it being understood that the pistons of both motor cylinders are adapted to operate synchronously.

Spur gears 21 and 22 are loosely mounted upon the axle 3 and are provided upon their inner faces with rims 6, which coöperate with clutch dogs 9 mounted upon a sleeve 7 keyed upon the axle 3 and movable thereon by means of a shipper lever 23. The spur gears 21 and 22 are in mesh with the spur gear 13, hence are driven in opposite directions, as indicated by the arrows. When the clutch member 7 occupies a neutral position the spur gears 21 and 22 are adapted to rotate freely upon the axle 3, but when said clutch member is moved to the limit of its throw in one direction or the other one of the spur gears 21 or 22 is clutched to the axle so as to rotate therewith. The shipper lever 23 may be operated in any manner and for convenience a motor cylinder 24 is provided and connected to a companion motor cylinder 25 by suitable pipes 26 and 27, between which a valved equalizing pipe 28 is arranged. An operating lever 29 is connected with the piston of the motor cylinder 25 for operating the same when it is required to throw the shipper lever 23 to move the clutch to the required position.

Fig. 1 represents the invention applied to a motor driven truck, whereas Figs. 4, 5 and 6 illustrate the invention applied to trailers or to the trucks of cars, which are drawn or propelled by motor cars. In Fig. 4 the axle 30 is provided with a spur gear 31 keyed thereto and meshing with a spur gear 32 fastened to one end of a longitudinal shaft 33. The axle 34 is provided with a spur gear 35 mounted loosely thereon and meshing with a spur gear 36 secured to the opposite end of the longitudinal shaft 33. The spur gear 35 is adapted to be secured to the axle 34 by means of a clutch similar to the clutch described in connection with Figs. 1, 2, and 3, the clutch sleeve 7 being keyed to the axle 34 and provided with clutch dogs adapted to engage with the inner side of the clutch rim 6 provided upon one side of the spur gear 35. A shipper lever 37 is provided to operate the clutch and is adapted to be actuated by means of a motor cylinder 38, which is connected by pipes 39 and 40 with a motor cylinder, not shown, similar to either of the motor cylinders 18 or 25. When the clutch is moved to release the spur gear 35 the axles 30 and 34 are adapted to rotate in the same direction, but when the clutch is thrown to secure the spur gear 35 to the axle 34, the axles 30 and 34 are caused to rotate in opposite directions, hence the action of one tends to neutralize the action of the other with the result that the speed of the car is checked.

In the arrangement illustrated in Fig. 5 each of the axles 41 and 42 is provided with a spur gear 43 loose thereon and with a clutch similar to that disclosed in Figs. 1 and 2 and embodying a sleeve 7, clutch dogs mounted upon the sleeve and a clutch rim 6 provided upon a side of the spur gear 43. Springs 44 mounted upon the axles 41 and 42 normally exert a pressure to force the clutches into engagement so as to secure the spur gears 43 to the respective axles. A longitudinal bar 45 connects the clutch sleeves 7 of the movable clutch members and is connected at a middle point with the piston of a motor cylinder 46, which is coupled to the train pipe 47. Under normal conditions the pressure of the medium contained in the train pipe 47 serves to hold the piston of the motor cylinder 46 so as to throw the clutches out of action and thereby admit of the spur gears 43 turning loosely upon the axles 41 and 42. Should the pressure within the train pipe be relieved from any cause the springs 44 come into play and automatically operate the clutches to secure the spur gears 43 to the respective axles 41 and 42 with the result that said axles are caused to rotate in opposite directions and thereby reduce the speed of the car by reason of the traction between the car wheels and the rails.

Fig. 6 shows a truck having three axles 48, 49, and 50, the same being provided with respectively spur gears 51, 52 and 53 mounted loosely thereon and adapted to be secured thereto by clutches constructed substantially in the manner herein set forth. Springs 54 mounted upon the respective axles normally exert a force to throw the clutches into operation to secure the spur gears to the axles. Shipper levers 55 and 56 are mounted between their ends upon the truck frame and engage the respective clutch sleeves. A motor cylinder 57 has its piston connected with one of the shipper levers, as 55, and is in communication with the train pipe 58. The pressure of the medium contained in the train pipe 58 exerts a force upon the piston of the motor cylinder 57 sufficient to overcome the tension of the springs 54 and throw the several clutches out of action. In the event of the pressure in the train pipe 58 being reduced from any cause the tension of the springs 54 is sufficient to throw the respective clutches into operation, thereby securing the spur gears to their respective axles, with the result that the axles are caused to rotate in opposite directions. A longitudinal shaft 59 is provided at one end with a spur gear 60, which meshes with the spur gear 51 and has a spur gear 61 at its opposite end in mesh with the spur gear 52. A longitudinal shaft 62 is provided at one end with a spur gear 63, which is in mesh with the spur gear 53 and at its opposite end with a spur gear 64, which is in mesh with the spur gear 52. Under normal conditions the axles 48, 49, and 50 are free to rotate in the same direction, but when the clutches are set the axles rotate in opposite directions, that is if the axle 49 is rotating in a clockwise direction the axles 48 and 50 are caused to rotate in an anticlockwise direction, and by reason of the difference in the diameters of the spur gears the neutralizing effect is about equalized.

In the forms hereinbefore described it is assumed that the car wheels are secured to the axles so as to rotate therewith. In the construction shown in Fig. 7 the car wheel 65 is loose upon the axle 66 and is provided with a spur gear 67 formed with a clutch rim 6 and in mesh with a spur gear 68 mounted upon an axle 69. A third spur gear 70, secured to the axle 66, is in mesh with the spur gear 68. The movable clutch member consists of a sleeve 7 and clutch dogs 9 and is keyed upon the axle to turn therewith. A shipper lever 71 provided for operating the movable clutch member is connected with the piston of a motor cylinder 72, which latter has connection with the turn pipe 73. A spring 74, mounted upon the axle 66, normally exerts a pressure to throw the clutch into operation, but the pressure within the train pipe 73, acting through the motor cylinder 72, holds the clutch out of action. Under abnormal conditions tending to reduce the pressure within the train pipe 73 the spring 74 is relieved of restraining force, hence comes into play and throws the clutch into operation, thereby securing the wheel 65 to the axle or to the part to which the clutch sleeve 7 is keyed, so that the wheels 65 and axle 66 may rotate in opposite directions. It will thus be understood that by providing the axle 66 at one end with a wheel fast thereto and at its opposite end with a loose wheel, as 65, both wheels when the clutch is thrown tend to rotate in opposite directions, hence the effect of one is to neutralize the action of the other.

It is preferred to employ spur gears, thereby insuring positive rotation of the parts, but friction gears may be employed and such adaptation is illustrated in Fig. 8. While spur gears of any variety may be employed it is preferred as illustrated to employ spur gears of the bevel or miter type, which provide a maximum engaging surface.

In the arrangement disclosed in Fig. 8 the axle 75 is provided with a friction gear 76 fastened thereto and with a wheel 77 loose thereon, said wheel being provided with a friction gear 78 having a clutch rim 6 with which clutch dogs 9 coöperate, said clutch dogs being mounted upon a sleeve 7 keyed to an extension of the friction gear 76. A spring 79 normally tends to throw the movable clutch member into action. A friction gear 80 is in mesh with the friction gears 76 and 78 and a fourth friction gear 81 likewise meshes with the friction gears 76 and 78. A shipper lever 82 has one end connected with the clutch sleeve 7 and its opposite end connected with the piston of a motor cylinder 83, which is connected with the turn pipe 84. The friction gears 80 and 81 are mounted upon movable members 85 and 86, which are connected by a member 87, an adjusting device 88 connecting two of the members in a manner to admit of the outer ends of the members 85 and 86 being relatively moved to insure firm connection between the meeting parts of the several friction gears. The adjusting device 88 consists of a screw mounted loosely in the outer end of the member 86 and threaded into the adjacent end of the member 87. The distance between the friction gears 76 and 78 is fixed, but the distance between the friction gears 80 and 81 is variable by reason of the mounting of said friction gears 80 and 81 upon the movable members 85 and 86. Wear between the friction gears is compensated for by the adjusting device 88, thereby insuring firm contact of the engaging portions so as to prevent slipping. When the pressure in the train pipe 84 is increased the piston of the motor cylinder 83 is moved so as to compress the spring 79 and hold the clutch out of action, but upon reduction of the pressure within the train pipe 84 from any cause the spring 79 comes into play and automatically sets the clutch, thereby causing the wheel 77 and the axle 75 to rotate in reverse directions. In the event of the axle 75 having a fixed wheel at one end and a loose wheel at the opposite end it will be understood that when the clutch is set both wheels tend to rotate in opposite directions, with the result that the action of one neutralizes that of the other.

While the invention is specifically designed for application to cars, it is to be understood that it may be adapted to vehicles of any nature or to moving bodies or machinery where advantage may be taken of oppositely rotating parts to check the speed and bring the moving body to a state of rest.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In combination rotative elements mounted to turn in the same or opposite directions, gearing between the two rotative elements having positive connection with one and loose connection with the other, and a clutch for throwing said gearing into engagement with the second rotative element to cause both rotative elements to turn in opposite directions, whereby the effect of one is neutralized by the other.

2. In combination rotative elements mounted to turn in the same or opposite directions, gearing between the two elements including a clutch, a motor cylinder operatively connected with the clutch to throw the same into action to cause the rotative elements to turn in opposite directions, and actuating means for said motor cylinder.

3. In combination rotative elements mounted to turn in the same or opposite directions, gearing between the two elements including a clutch, a motor cylinder operatively connected with the clutch to throw the same into action to cause the rotative elements to turn in opposite directions, actuating means for said motor cylinder, a second motor cylinder, pipe connections between the two motor cylinders to insure synchronous action of the pistons thereof, and an operating lever connected with the piston of the second motor cylinder for actuating the same.

In testimony whereof I affix my signature in presence of two witnesses.

ARTHUR B. JONES.

Witnesses:
O. E. OSBORN,
HARRY D. BENNETT.